(12) United States Patent
Foley et al.

(10) Patent No.: US 11,014,114 B2
(45) Date of Patent: May 25, 2021

(54) FEEDWATER SPARGER REPAIR

(71) Applicant: Westinghouse Electric Company LLC, Cranberry Township, PA (US)

(72) Inventors: Kevin J. Foley, Chattanooga, TN (US); Joshua C. Landers, Hixson, TN (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 16/520,523

(22) Filed: Jul. 24, 2019

(65) Prior Publication Data
US 2020/0030836 A1    Jan. 30, 2020

Related U.S. Application Data

(60) Provisional application No. 62/823,687, filed on Mar. 26, 2019, provisional application No. 62/702,939, filed on Jul. 25, 2018.

(51) Int. Cl.
*B05B 15/14* (2018.01)

(52) U.S. Cl.
CPC ........... *B05B 15/14* (2018.02); *Y10T 137/598* (2015.04)

(58) Field of Classification Search
CPC ............................. B05B 15/14; Y10T 137/598
See application file for complete search history.

(56) References Cited

U.S. PATENT DOCUMENTS

| | | | | |
|---|---|---|---|---|
| 4,834,935 A * | 5/1989 | Daigle | ................. | G21C 13/032 376/292 |
| 4,859,403 A | 8/1989 | Dixon et al. | | |
| 5,345,484 A * | 9/1994 | Deaver | ................ | G21C 13/032 376/407 |
| 6,375,130 B1 * | 4/2002 | Jensen | .................... | G21C 13/02 248/74.1 |
| 6,456,682 B1 * | 9/2002 | Jensen | ................. | G21C 13/036 376/282 |
| 7,492,851 B2 * | 2/2009 | Butler | .................... | G21C 13/02 376/277 |
| 9,437,333 B2 * | 9/2016 | Foley | ................... | G21C 17/003 |
| 9,887,016 B2 * | 2/2018 | Nopwaskey | ......... | G21C 17/017 |
| 2008/0112530 A1 * | 5/2008 | Jensen | ................... | G21C 15/18 376/282 |
| 2011/0235770 A1 * | 9/2011 | Jensen | ................ | G21C 13/036 376/347 |

* cited by examiner

*Primary Examiner* — Kevin R Barss
(74) *Attorney, Agent, or Firm* — K&L Gates LLP

(57) ABSTRACT

Described herein is a clamp for repairing a site of at least one damaged nozzle on a pipe for carrying liquid, such as a sparger nozzle in a header pipe in a boiling water reactor of a nuclear power plant. The clamp in general includes a housing configured for mounting over the site on a surface the pipe, wherein the housing has a front, sides, top, and back. The housing may include an opening, or the clamp may include an orifice plate having an opening and being positioned on the front side of the housing such that liquid exiting the pipe flows through one or both the opening in the housing and opening in the orifice plate. The clamp also includes a bottom surface which, together with the housing and orifice plate, when included, defines an interior chamber. The bottom plate has an opening for alignment, upon installation, with the site, and at least one member, for example, wedges for securing one of the damaged nozzle or support rings for stabilizing a replacement nozzle in position within the housing.

22 Claims, 9 Drawing Sheets

FEEDWATER SPARGER REPAIR

BACKGROUND OF THE INVENTION

1. Field of the Invention

This invention relates to feedwater spargers used in nuclear power plants, and more particularly to clamps for repairing damaged feedwater spargers and nozzles.

2. Description of the Prior Art

An exemplary feedwater pipe system used in a nuclear power plant uses lengths of pipe in various aspects of the plant operations. Some of the pipes, for example those found in boiling water reactors, include nozzles for the distribution of water. In an exemplary power plant, there may be about one hundred twelve (112) feedwater nozzles extending from certain segments of the pipes. Reactor vessel feedwater spargers are incorporated in the feedwater system. The feedwater spargers are internal, non-pressure boundary items which attach to the reactor pressure vessel at a central thermal sleeve inserted into the feedwater nozzle, and are pinned to the vessel wall at either end. It is a non-structural attachment according to the American Society of Mechanical Engineers (ASME®) Code and is indirectly attached to the vessel. The primary function of the feedwater sparger is to uniformly distribute the feedwater flow within the reactor pressure vessel. The feedwater sparger nozzles direct the flow towards the center of the vessel such that the colder water does not impinge upon the reactor pressure vessel wall in an effort to minimize the potential of thermal fatigue in the vessel cladding.

Visual inspection of off-line nuclear reactors has revealed "through wall damage" on adjacent nozzles of feedwater spargers used in feedwater pipes upstream of reactor pressure vessels. The breaches were caused by foreign material inside the feedwater sparger pipe that repeatedly impacted the feedwater sparger pipe wall, weld adapter, and elbows over a period of time during plant operation.

Current repair designs require modification to existing plant hardware, and may require underwater machining, such as electric discharge machining, that would permanently change plant hardware and add outage duration or continued operation risk if the clamp or repair could not be installed.

SUMMARY OF THE INVENTION

An exemplary purpose of the solutions described herein is to outline options to restore the damaged feedwater sparger nozzles at a nuclear power plant. The solutions described herein include embodiments of a nozzle stabilizer clamp where damaged nozzles remain in place and a nozzle replacement clamp where the damaged nozzles are removed.

In various aspects, there is provided a clamp for repairing a site of at least one damaged nozzle on a pipe for carrying liquid. The clamp in general includes a housing configured for mounting over the site on a surface of the pipe, the housing having a front, sides, top, and back, and an opening through the front of the housing through which liquid from the pipe can flow, a bottom surface which, together with the housing defines an interior chamber, the bottom plate having an opening for alignment, upon installation, with the site, and at least one member for securing one of the damaged nozzle or a replacement nozzle in position within the housing.

The bottom surface may have a concavely curved surface for complementary contact with the convexly curved surface of the pipe for sealing the housing against leaks.

The securing member may comprise a wedge shaped and preferably biased to provide at least three points of contact on each side of the damaged or replacement nozzle. In various aspects, the securing member may comprise a plurality of wedges in contact with the damaged or replacement nozzle for securing the nozzle in a stable position within the housing. The wedges may include one or more of front wedges, back wedges and top wedges for providing at least three points of contact on each side of the damaged nozzle. In various aspects, a spring may be positioned between each of the top and back wedges to bias the wedges into maintaining contact with the damaged or replacement nozzle in the event of movement of the nozzle; for example from vibrations of the various components, pressure from the liquid, or changes in temperature within the environment where the pipe is located. In various aspects, the nozzle (damaged or replacement) has curved surfaces and the front wedges may each include at least one side portion and a curved portion configured for complementary contact with the curved surfaces of the damaged nozzle or replacement nozzle.

In various aspects, the site on the pipe is an opening where a damaged nozzle was removed, and the securing member comprises a support ring surrounding the opening for positioning the replacement nozzle. The replacement nozzle may be integrally machined into the housing interior and may have a nozzle orifice in alignment, upon installation, with the orifice of the housing.

The clamp may additionally include a rear guard plate mounted to the back of the housing for preventing liquid impingement upon the vessel walls containing the pipe.

In various aspects, the clamp may include a latch for locking the housing and bottom surface together onto the pipe. The front of the housing may define a latch opening and the latch may include a leg and an arm that extends from the upper portion of the leg. The latch may be positioned such that the leg extends through the bottom surface and the arm, when rotated upon installation, extends outwardly through the latch opening to lock the housing and bottom surface together onto the pipe.

In certain aspects, the housing may further include an orifice plate positioned on the front side of the housing, the orifice plate having an opening aligned with the orifice in the housing. The latch in such aspects, may lock the housing, the orifice plate and the bottom surface together onto the pipe. The front of the housing may define the latch opening, and the latch preferably includes a leg and an arm extending from the upper portion of the leg, the latch being positioned such that the leg extends through the bottom surface and the arm, when rotated upon installation, extends outwardly through the latch opening to lock the housing, the orifice plate and bottom surface together onto the pipe.

The clamp may include a pair of legs extending downwardly from the housing. In various aspects, the legs may comprise an elongate front section, a pipe support section, and a transverse bar joining the front and support sections, wherein the support section is configured for contact, upon installation, with the pipe.

In various aspects, the pipe is a header pipe and the nozzles are sparger nozzles immersed in a liquid filled vessel. In various aspects, the vessel is a portion of a nuclear power plant.

BRIEF DESCRIPTION OF THE DRAWINGS

The characteristics and advantages of the present disclosure may be better understood by reference to the accompanying Figures.

DESCRIPTION OF THE PREFERRED EMBODIMENTS

As used herein, the singular form of "a", "an", and "the" include the plural references unless the context clearly dictates otherwise. Thus, the articles "a" and "an" are used herein to refer to one or to more than one (i.e., to at least one) of the grammatical object of the article. By way of example, "an element" means one element or more than one element.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Further, any numerical range recited herein is intended to include all sub-ranges subsumed therein. For example, a range of "1 to 10" is intended to include any and all sub-ranges between (and including) the recited minimum value of 1 and the recited maximum value of 10, that is, having a minimum value equal to or greater than 1 and a maximum value of equal to or less than 10.

NOZZLE STABILIZER CLAMPS. This solution may in various aspects, be used if the two damaged nozzles will be left in place. The nozzle stabilizer clamp 10 may be a multi-part clamp designed to be installed remotely, for example, from the refuel floor. The materials used in this repair will be compliant with industry guidelines for materials that can be used in boiling water reactor vessels (e.g., BWRVIP-84). The nozzle stabilizer clamp 10 is designed to minimize critical path installation time and to not interfere with vessel component removal.

Figure 1:
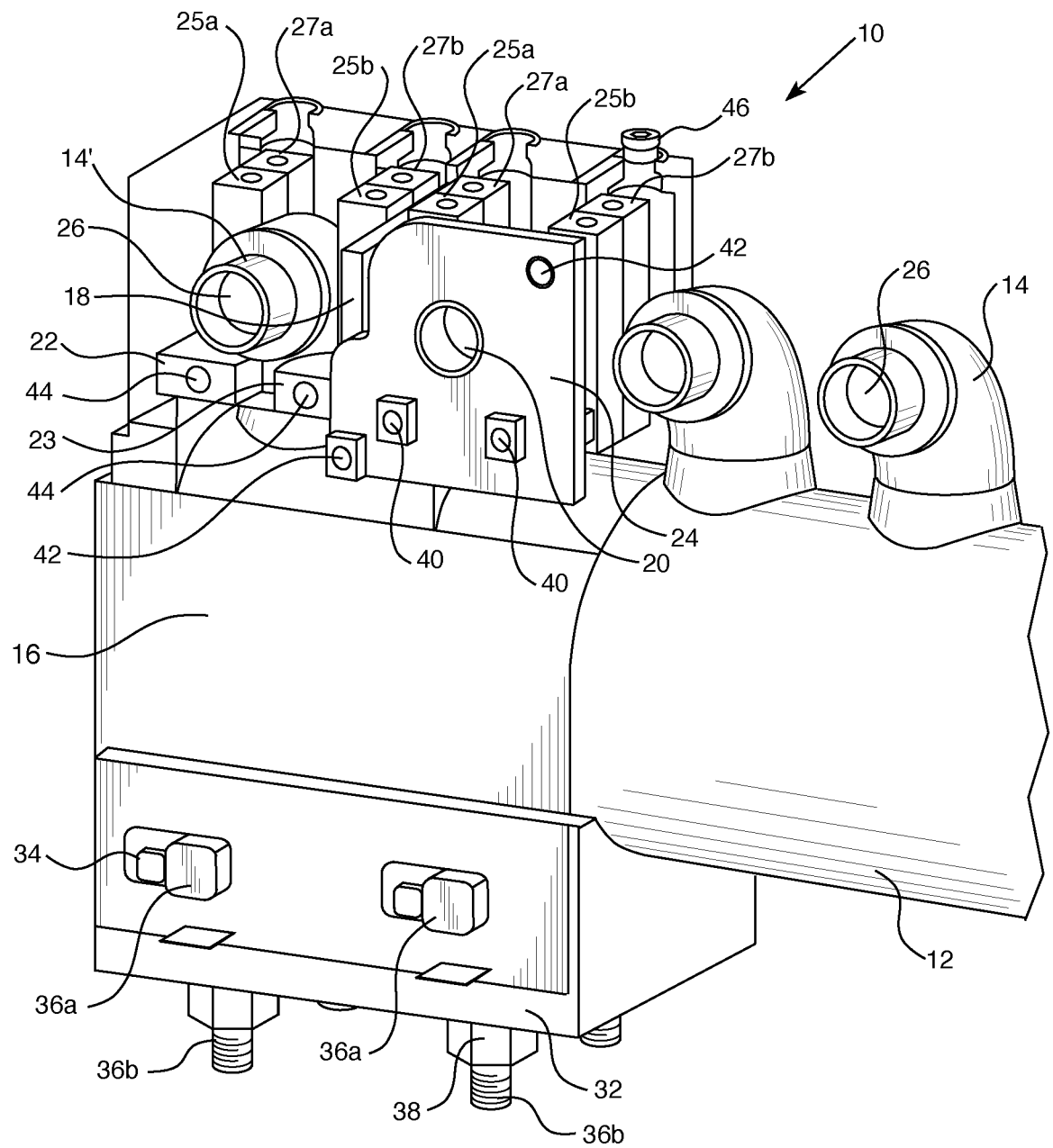
FIG. 1 illustrates a perspective view of one side of an embodiment of a nozzle stabilizer clamp assembly for repairing a damaged nozzle, mounted on a feedwater header pipe, with a partially cut-away view to show internal parts.
Figure 2:
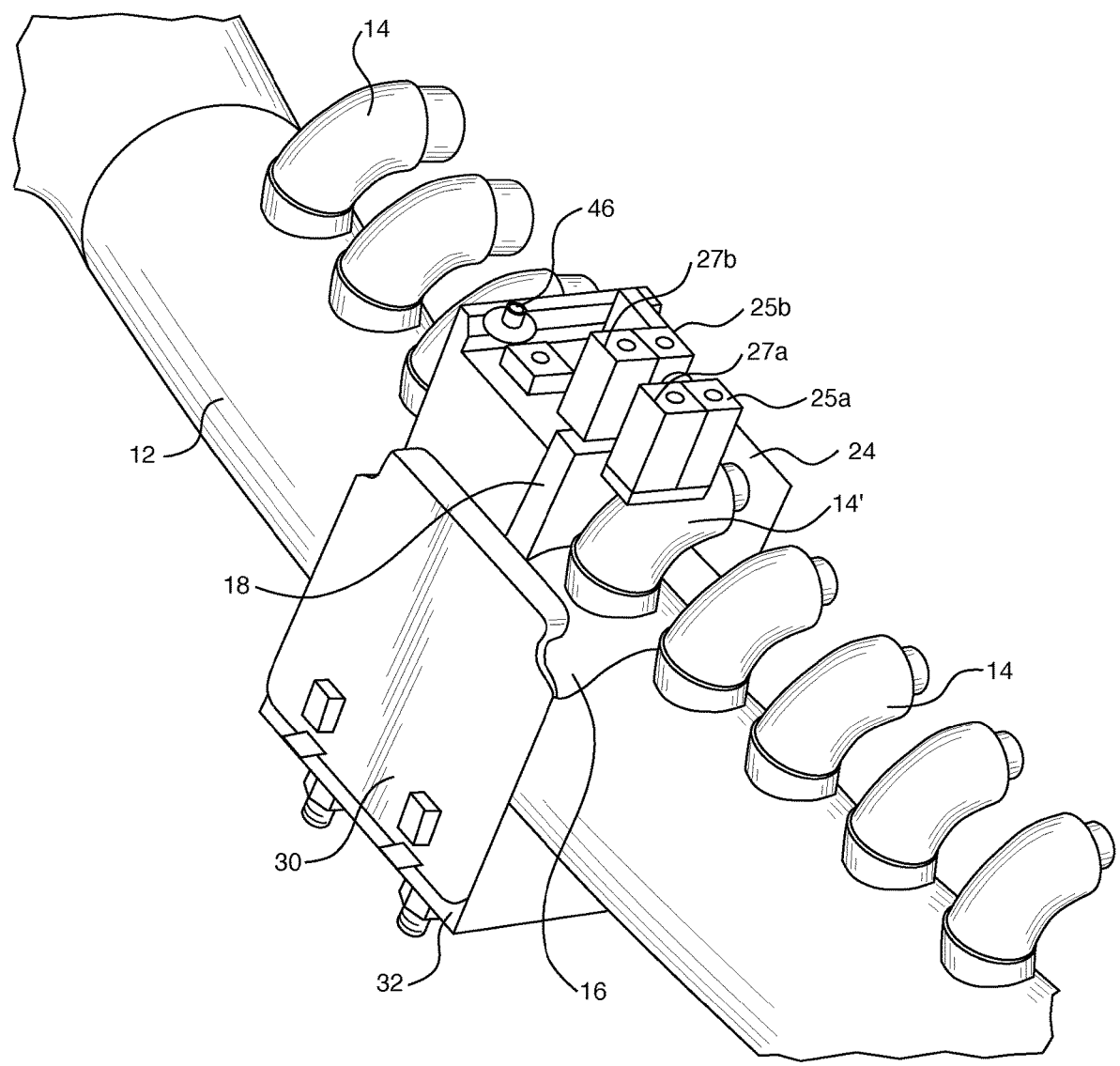
FIG. 2 illustrates a perspective view of another side of the embodiment of the nozzle stabilizer clamp assembly shown in FIG. 1.

Referring to FIGS. 1 and 2, an embodiment of the clamp 10 for use with two damaged nozzles is shown. The housing 16 of the clamp 10 fits over the two damaged nozzles 14' (only one is visible in the drawing). The housing 16 rests on top of the feedwater header pipe 12 defining an interior chamber (such as chamber 90 shown in FIG. 10) and has features to prevent rotation about the pipe. The housing 16 to header pipe 12 interface is precision machined to closely match the header pipe 12 profile and minimize leakage. Additional features, such as seals, can be incorporated to remove the possibility of leakage. The embodiment of the housing 16 shown contains a divider plate 18 between the two damaged nozzles 14'. The divider plate 18 ensures that the flow from each nozzle 14' is correctly diverted to each respective nozzle outlet 26. The housing 16 contains members to secure the nozzle within the housing 16. The securing members may be one or more specially designed wedges, such as wedges 25 and 27 configured to contact and stabilize the nozzle. In various aspects, side wedges 25a and 27a may be positioned in front and back positions, respectively, relative to each other on one side of the nozzle 14', and side wedges 25b and 27b are positioned in front and back positions, respectively, relative to each other on the side of the nozzle 14' opposite wedges 25a and 27a. FIG. 1 shows the wedges in housing 16 and FIG. 2 shows them still positioned outside of housing 16 for clarity of the view, but in practice, the wedge is, or wedges are, placed in housing 16. The wedge or wedges can be remotely placed, or actuated, using, for example, tools mounted on extended poles manually or hydraulically operated from the refuel floor or a bridge above the vessel cavity to tighten around the existing nozzle 14' to provide two point contact on each left and right side of the top and back of the nozzle. Holes in the tops of wedges 25a,b and 27a,b align with holes in housing 16 to receive any suitable fasteners, such as bolts, pins, nails, screws, clips and the like. An exemplary fastener 46 is shown to illustrate the fastener going through housing 16 into wedge 27b. A similar fastener would be inserted into each hole to secure the wedges within the housing in contact with damaged nozzles 14'.

A front nozzle stabilizer plate 24 is bolted onto the front of the housing 16 with orifice 20 of plate 24 concentric with the nozzle 14' outlet 26. Only one front stabilizer plate 24 is shown to allow a view of the interior of housing 16, but a front nozzle stabilizer plate 24 would be placed on the front of each damaged nozzle 14' in practice. Holes 42 in stabilizing plate 24 receive bolts or any suitable fasteners to attach plate 24 to housing 16. The stabilizer plate 24 also contains holes 40 to align with holes 44 of several specially designed remotely actuated stabilizing wedges 22 and 23 to provide the third point of contact on the front underside of the nozzle 14'. A suitable fasteners passes through aligned holes 40 and 44 to secure plate 24 to wedges 22 and 23. Stabilizing wedges 22 and 23 are positioned under the elevated portion of the nozzle 14' on the interior side of stabilizing plate 24. With all wedges 22, 23, 25, and 27 actuated the nozzle 14' is completely captured from a foreign materials exclusion (FME) standpoint (i.e., the various parts of the clamp assembly and the damaged nozzle will remain clamped to pipe 12 and will not fall into the reactor) and stabilized from a flow and vibration standpoint (i.e., the parts of the clamp assembly and the damaged nozzle are secured sufficiently to prevent the forces known to be applied to the header pipe 12 and nozzles 14 in a given power plant to loosen any of the parts or nozzle, thereby preventing them from falling into the reactor). The securing members comprised of a single specially configured wedge or multiple wedges, such as those just described, provide at least three points of contact on each side of the nozzle.

Referring to FIG. 2, a rear guard plate 30 attaches to the back side of the housing 16 between the housing and the reactor pressure vessel wall (not shown). The primary function of the rear guard plate 30 is to prevent the possibility of cold water impingement upon the reactor pressure vessel wall. The rear guard plate 30 also acts as an attachment point between the housing 16 and the bottom clamping device 32.

The bottom clamping device 32 is installed below the header pipe 12 and rigidly affixes the housing 16 and rear guard 30 to the header pipe 12. The bottom clamping device 32 contains several remotely actuated latches 36 that securely tighten the clamp 10 assembly together. In various aspects, latches 36 have an arm 36*a* and a leg 36*b* perpendicular to the arm. In an exemplary embodiment, the end of leg 36*b* extends from the bottom clamping device 32 and the end of arm 36*a* extends through opening 34 of housing 16. Rotation of leg 36*b* by a remotely positioned appropriate known tool mounted to the end of an elongate pole causes arm 36*a* to rotate into and out of opening 34. A nut 38 is threaded on to the end of leg 36*b* to secure the latch 36 into position. FIG. 1 shows arm 36*a* in the engaged position, rotated such that the end of arm 36*a* extends outwardly through opening 34. The various fasteners of the clamp 10 assembly are torqued to a specific value to compensate for thermal expansion that is determined through analysis described in later sections.

All bolted connections and latches 34 incorporate controls to ensure FME prevention and that tightness is maintained during its service life.

Installation Tooling and Process

The tooling associated with this repair will be normal "outage style" tooling known to those who work with boiling water reactors. The tooling will be FME hardened and powered by either power plant air or water hydraulics. The tooling delivery method will be rope, air/hydraulic lines or small handling poles. The tooling and repair process will be monitored by standard underwater camera systems.

The housing 16 of the clamp 10 is lowered into the reactor pressure vessel and positioned over the damaged feedwater sparger nozzles 14' with a remotely actuated tool. The housing is held in place with the tool until the rear guard plate 30 and bottom clamping device 32 are installed. The bottom clamping device 32 is then lowered into the reactor pressure vessel and positioned under the header pipe 12 with a remotely actuated tool. The rear guard plate 30 is also installed with a remotely actuated tool. After all three pieces are in place, the bottom clamping device's latches 34 are actuated by rotating the arms 36*a* to extend outwardly through opening 34. Nuts 38 are then placed over the legs 36*b* of each latch. This securely mounts the clamp 10 assembly to the header pipe 12 and the delivery tools are removed.

Next, the front nozzle stabilizer plate 24 is delivered and bolted onto the front of the housing 16 with remote tooling. The wedges 22, 23, 25*a,b*, and 27*a,b* are then tightened in a sequence to ensure positive nozzle engagement and capture. After all bolts and capture devices are correctly tightened, the locking devices are engaged.

A visual inspection and "as-left" video will then be performed and documented. Future inspections of the installed clamp 10 may be by visual inspections.

NOZZLE REPLACEMENT CLAMP. In various aspects, an embodiment of the solution provided herein may be used when the damaged nozzles 14' (two are shown) are to be removed. The nozzle replacement clamp 100 is a multi-part clamp designed to be installed remotely, for example from the refuel floor of a reactor, in a manner similar to that described for the Nozzle Stabilizer Clamp 10. The materials used with the Nozzle Replacement Clamp 100 repair are selected from those known to be compliant with industry guidelines, e.g., BWRVIP-84. The clamp 100 is designed to minimize critical path installation time and to not interfere with vessel component removal. Additional features, such as seals, can be incorporated to remove the possibility of leakage.

Figure 3:
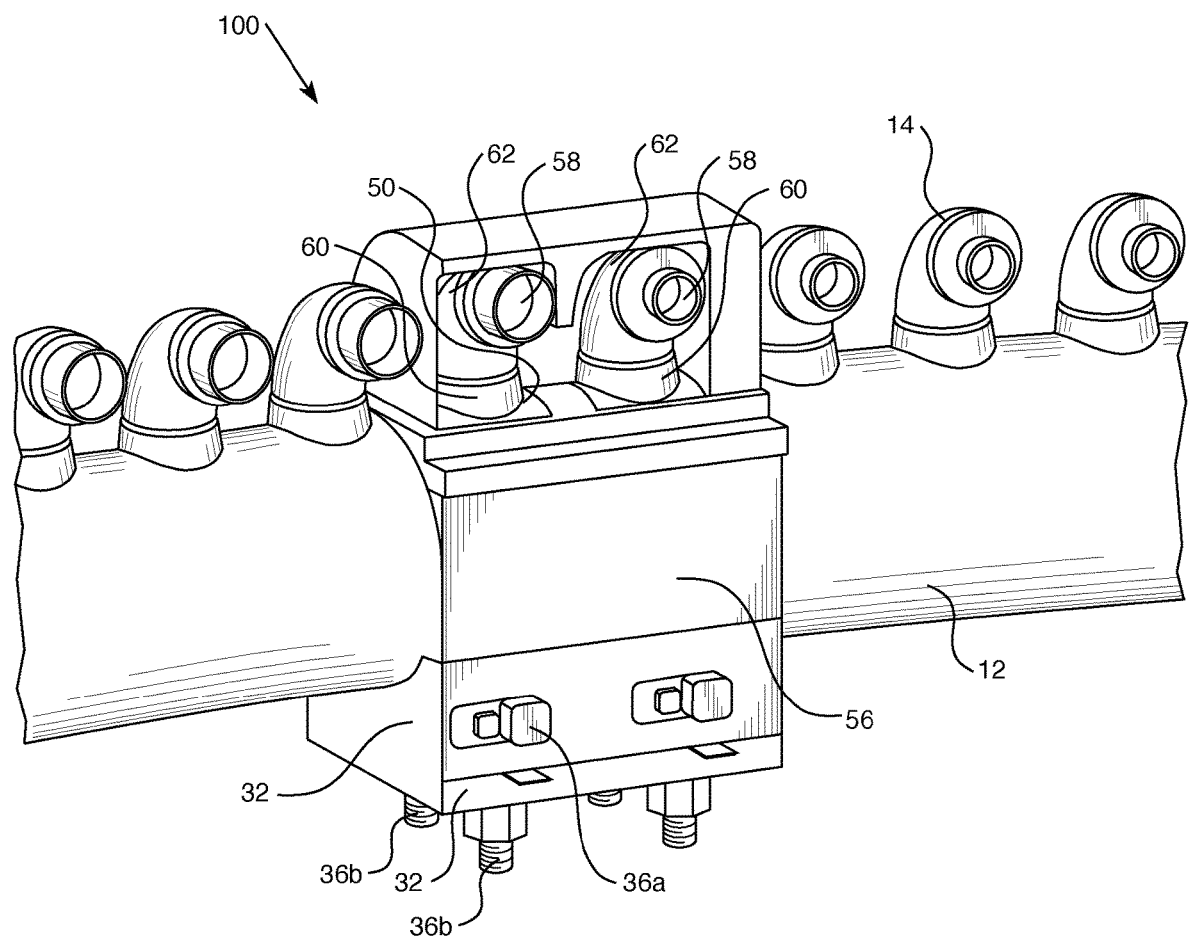
FIG. 3 illustrates a perspective view of one side of an alternative embodiment of a nozzle stabilizer clamp assembly for replacing a damaged nozzle, mounted on a feedwater header pipe.

The housing 56 of the clamp 100 fits over holes 50 in the header pipe 12 created when the damaged nozzles were removed. The housing 56 rests on top of the feedwater header pipe 12 and has features to prevent rotation about the pipe. The housing 56 to header pipe interface is precision machined to closely match the header pipe profile and minimize leakage. In various aspects, the housing 56 may include one or more machined replacement nozzles 62 that fit over a member for securing a nozzle 62, such as end rings 60 which may be formed around each hole 50 when the damaged nozzles are removed. The machined replacement nozzle or nozzles may, for example, be built into housing 56 as an integral part thereof or may be separately installed before housing 56 is installed. The nozzles 62 have outlets 58 for fluid flow. The housing 56 may have a front plate, similar to the stabilizer plate 24 of clamp 10, or may be open-faced as shown in FIG. 3. If a front plate is used, orifices that align with outlets 58 of nozzles 62 would be included.

The housing 56, in various aspects, may contain a divider plate similar to divider plate 18 in clamp 10 (shown only in part for ease of viewing the interior of housing 56) positioned between the two holes when necessary to replace two damaged nozzles, and if it is decided to separate the flow back into two different exit openings 58. The divider plate 18 ensures that the flow from each header pipe hole 50 is correctly diverted from each of the respective nozzle outlets 58 through front plate openings, or orifices. If it is decided not to separate the flow from the two holes, there will no divider plate and there will be one orifice in the front plate, or there may be an open-faced front on the housing 56. The need for a divider plate and one or two orifices will be determined through flow analysis under the conditions of a given power plant, as described hereinbelow. The housing 56 in various aspects will have the orifices already machined into the housing 56 body with no need for additional hardware.

A rear guard plate 30 similar to the rear guard plate 30 in clamp 10 attaches to the back side of the housing 56 between the housing 56 and the reactor pressure vessel wall (not shown). The primary function of the rear guard 30 is to prevent the possibility of cold water impingement upon the reactor pressure vessel wall. The rear guard also acts as an attachment point between the housing 56 and the bottom clamping device 32, also similar to bottom clamping device 32 in clamp 10. In various aspects, the rear guard plate 30 is integral to housing 56, and not a separate item.

The bottom clamping device 32 is installed below the header pipe 12 and rigidly affixes the housing 56 and rear guard plate 30 to the header pipe 12. The bottom clamping device 32 contains several remotely actuated latches 36 each comprised of an arm 36a and a leg 36b, similar to latches of clamp 10, which securely tighten the assembly together. The latches 36 and various fasteners to hold housing 56 of the assembly on to pipe 12 are torqued to a specific value to compensate for thermal expansion that is determined through analysis described in later sections.

All bolted connections and latches incorporate controls to ensure FME prevention and that tightness is maintained during its service life.

The tooling associated with this repair will be normal "outage style" tooling. The tooling will be FME hardened and powered by either plant air or water hydraulics. The tooling delivery method will be rope, air/hydraulic lines or small handling poles. The tooling and repair process would be monitored by standard underwater camera systems.

In various aspects, the housing 56 of the clamp 100 is lowered into the reactor pressure vessel and positioned over the damaged feedwater sparger nozzle holes 50 with a remotely actuated tool. In various aspects, if separate replacement nozzles are used, the replacement nozzles 62 will be secured to rings 60 formed around holes 50 during the cutting operation where the damaged nozzles were removed and then housing 56 will be positioned over the replacement nozzles 62. In various aspects, replacement nozzles may be machined into and integral to housing 56 and lowered with housing 56 over rings 60 around holes 50. In either event, the housing 56 is held in place with the tool until the rear guard 30 (if separate) and clamping device are installed. After the rear guard is in place, if separate, the bottom clamping device 32 is lowered into the reactor pressure vessel and positioned under the header pipe 12 with a remotely actuated tool. The rear guard 30 is also installed with a remotely actuated tool if it is a separate item. After all three pieces (housing, rear guard, and bottom clamping plate) are in place, the bottom clamping device's latches 36 are actuated in a manner similar to the latches of clamp 10. This securely mounts the clamp 100 assembly to the header pipe 12 and the delivery tools are removed. After all bolts and capture devices are correctly tightened, the FME locking devices are engaged.

A visual inspection and "as-installed" video will be performed and documented. Future inspections of the installed clamp 100 may be by visual inspections.

ALTERATIVE EMBODIMENT OF NOZZLE STABILIZER CLAMP 10. The three main requirements of a repair to the sparger nozzles are: to prevent relatively cold water impingement onto the reactor pressure vessel potentially causing fatigue, to stabilize damaged nozzle elbows, and to maintain core enthalpy uniformity.

Figure 4:
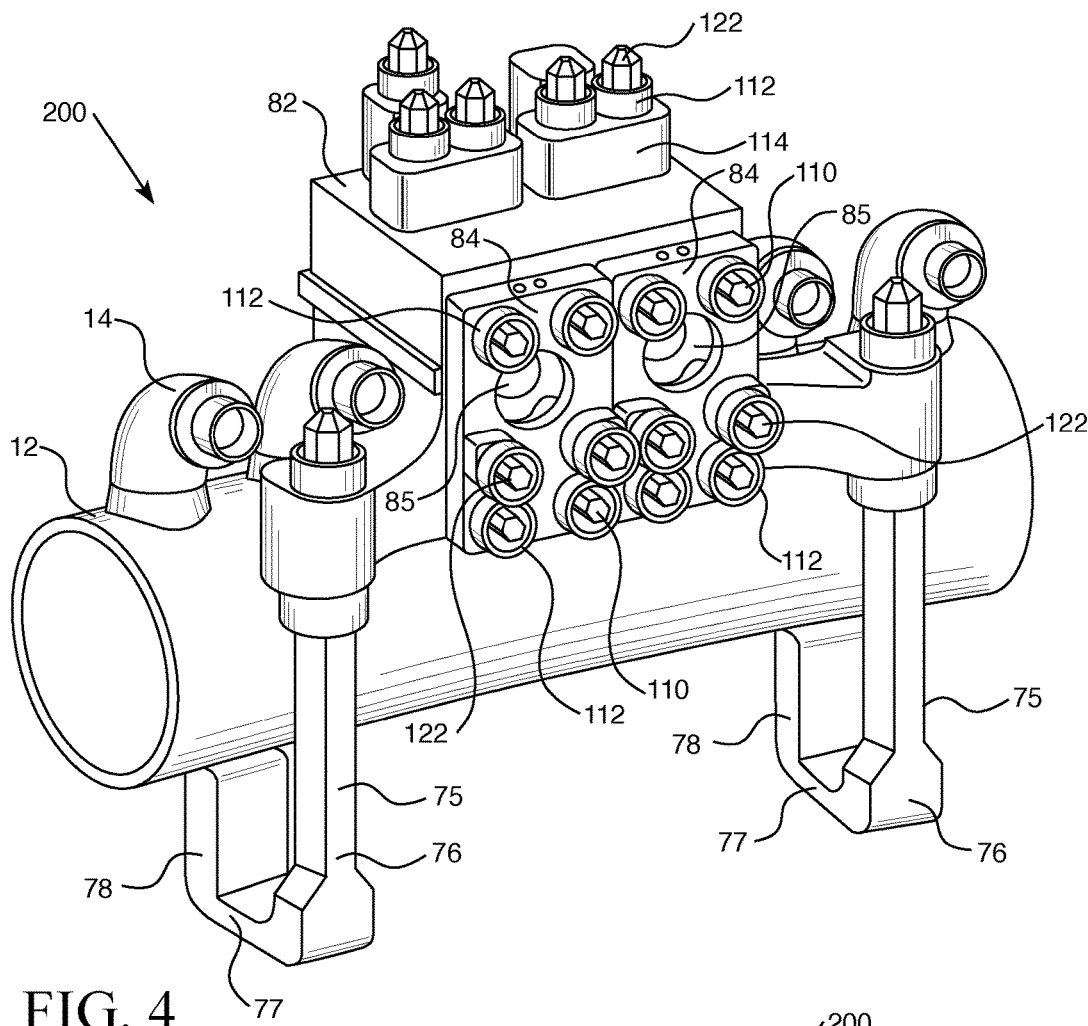
FIG. 4 illustrates a perspective view of another embodiment of a nozzle stabilizer clamp assembly mounted on a feedwater header pipe.
Figure 5:
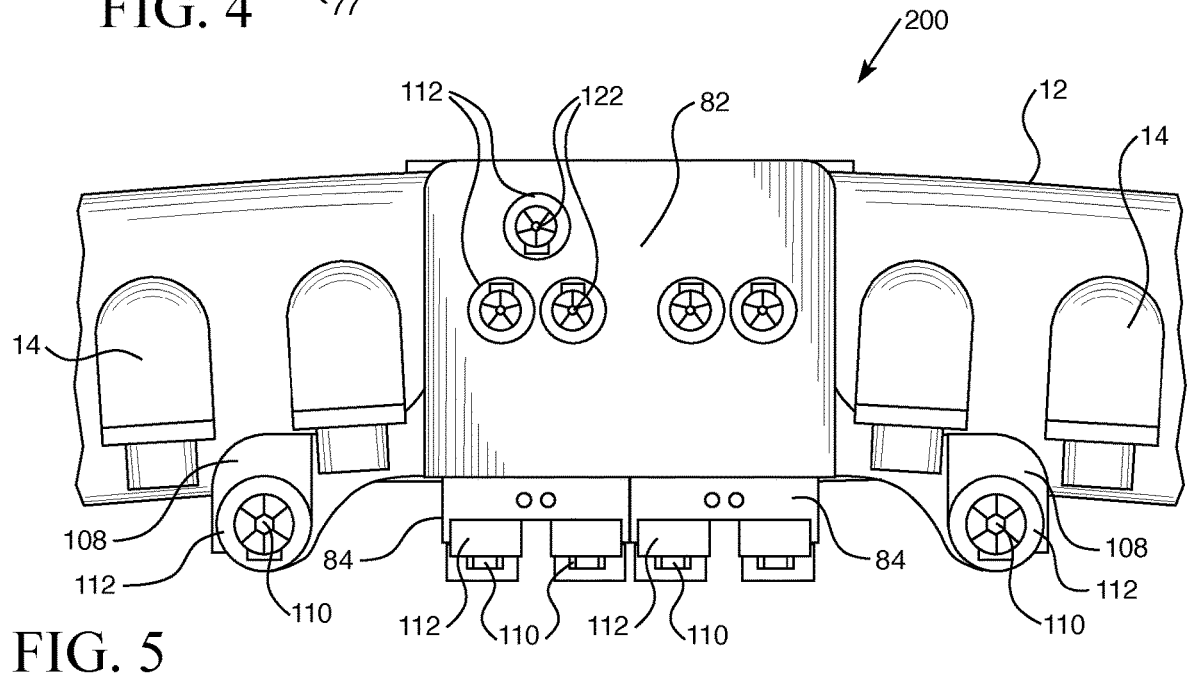
FIG. 5 illustrates a top of the nozzle stabilizer clamp assembly of FIG. 4.

As described above with regard to clamp 10, the repair clamp may fit over the damaged nozzle or nozzles 14' to stabilize each damaged nozzle and to redirect and control feedwater flow. FIGS. 4-11 illustrate an alternative embodiment of clamp 10, referred to herein as clamp 200. Referring to FIGS. 4 and 5, clamp 200 includes a housing 82, an orifice plate 84 for each damaged nozzle 14', and clamp legs 76. In the embodiment shown, the top surface of housing 82 includes optional bosses 114 through which fasteners 122 extend into the housing 82 to secure members for securing the nozzles, such as specially designed wedges 92 and 88 that support the damaged nozzle 14'.

Each orifice plate 84 (two are shown) has an opening 85 aligned in use with, and preferably concentric to, the outlets of nozzle 14'. The orifice plates 84 are attached to housing 82 by fasteners 110, such as bolts, screws, or any other suitable known fastener, secured with nuts and preferably shielded within surrounds 112. Two top and two bottom fasteners 110 are shown for each orifice plate 84.

Figure 6:
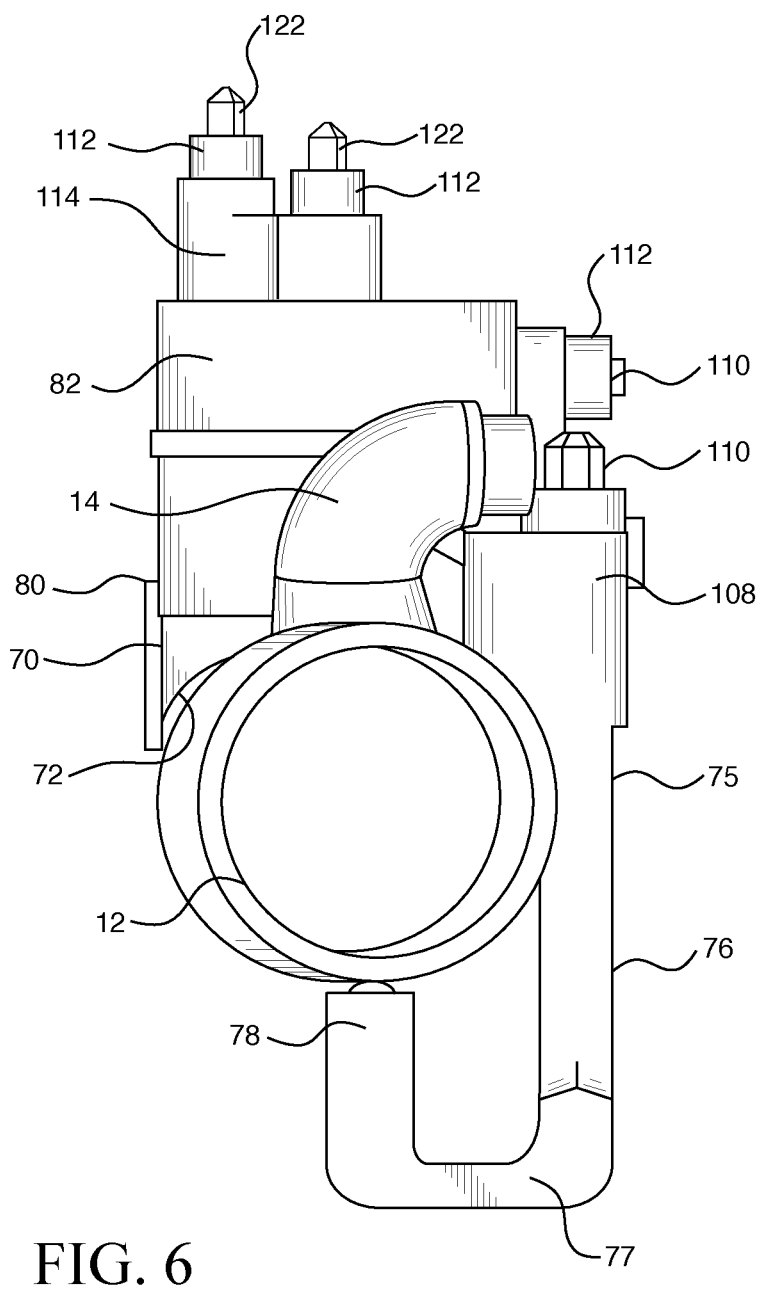
FIG. 6 illustrates a side view of the nozzle stabilizer clamp assembly of FIG. 5.
Figure 7:
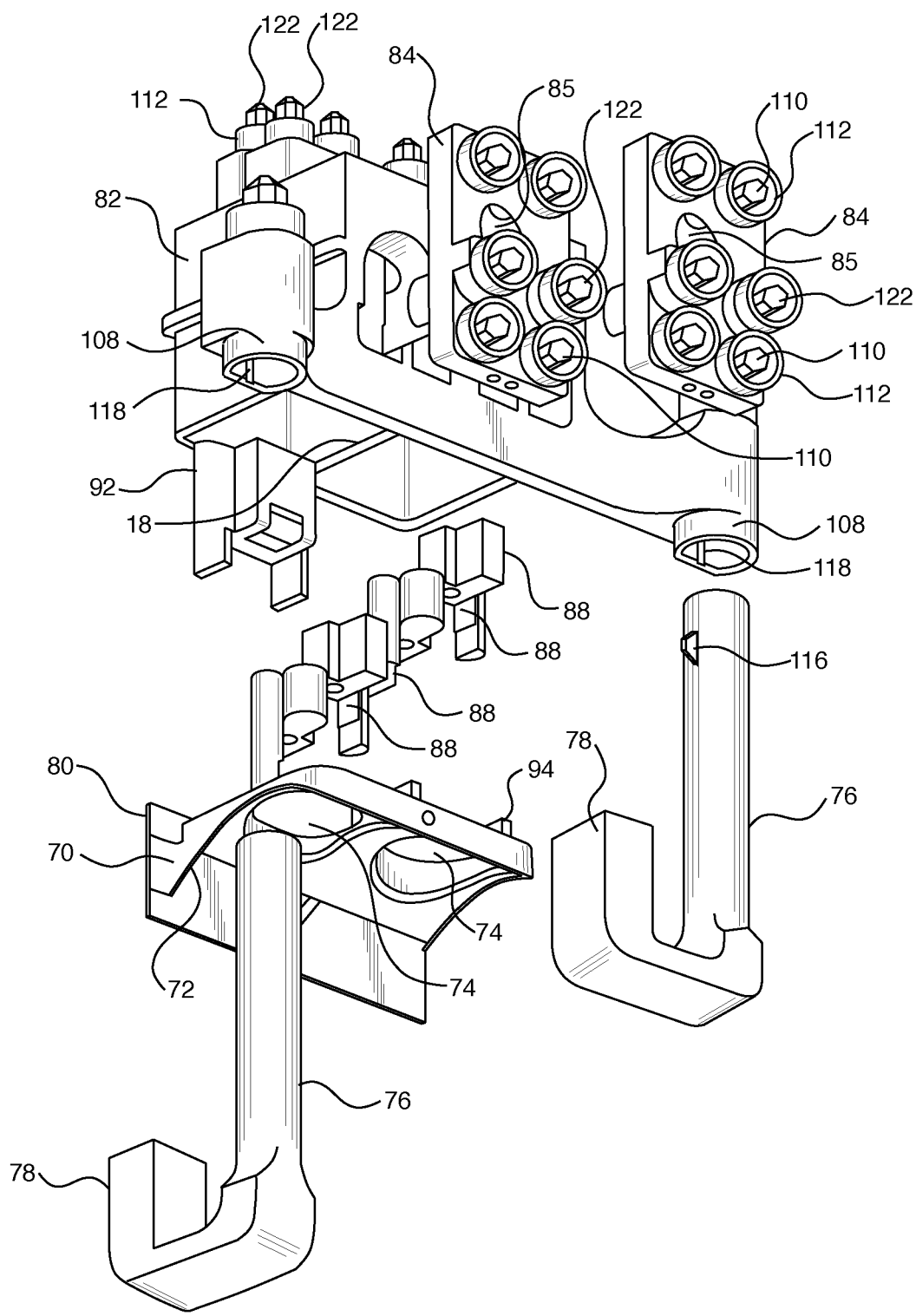
FIG. 7 illustrates an exploded view of the parts of the clamp assembly of FIG. 4.

In various aspects, legs 76 may be provided. Legs 76 may be generally J-shaped having a relatively elongate front section 75 that extends downwardly from housing 82 in front of pipe 12, a pipe support end 78 that is generally parallel to the front section 75 and is configured such that, in use, it will be in contact with the a rearward or frontward portion of the underside of pipe 12, and a cross-sectional bar 77 connecting the front section 75 and the support end 78 that straddles a portion of the underside of the pipe 12. There are at least two legs 76, one on each side of housing 82. As shown in FIGS. 6 and 7, the front section 75 of each leg 76 may be integrally attached to housing 82 or may be a separate item that is attached to housing 82 through receiving channels 108 on the front of housing 82. Each front section 75 may include a locking piece 116 for engagement with a complementary locking surface 118 in the interior of receiving channel 108 to prevent rotation of front section 75 within channel 108 in embodiments where the parts are separate. For example, the locking piece 116 may be in the form of a tab or other suitable shaped piece having contours complementary to a locking surface 118, such as a groove or concave depression in the interior surface of receiving channel 108. Alternatively, the front leg section 75 may have a groove or depression and the channel may have an extension that fits within the groove or depression. A suitable fastener 110, such as a bolt, extends into channel 108 and front leg section 75 to lock leg 76 onto housing 82. A nut is preferably used to secure fastener 110 in position. Surrounds 112 shield fastener 110.

Referring again to FIGS. 6 and 7, clamp 200 also includes a seal saddle 70 with integrated flow deflector shield 80, which in use is installed onto the feedwater header pipe 12. This seal saddle 70 is precisely machined to have a surface 72 configured to contact and closely match the contoured surface of the header pipe 12 to minimize leakage. The integrated flow deflector shield 80 redirects any leakage flow away from the reactor pressure vessel to prevent cold water impingement upon the reactor pressure vessel wall. The precision machining of seal saddle 70 with contact surface 72 may be used in the housings for clamps 10 and 100.

The housing 82 is installed on top of the seal saddle 70 creating a floor for the housing and defining therewithin a flow chamber 90 (see FIG. 10) to redirect flow from the header pipe 12 through orifice plates 84 installed onto the housing 82. On the interior surface of seal saddle 70 partially surrounding the opening 74 in the saddle where the nozzle 14' is located when installed, there may, in various aspects, be a saddle backstop 94 to provide a rear point of contact for the nozzle 14' to provide some support to the nozzle base. In various aspects, housing 82 may include one or more divider plates 18 to divide the housing into two or more separate chambers 90, one for each of the damaged nozzles 14'. The divider plate 18 ensures that the flow from each nozzle 14' is correctly diverted to each respective nozzle outlet. The housing 82 is clamped to the header pipe 12 by one or more legs 76, described above. Legs 76 and support ends 78 prevent movement and rotation of the housing 82.

Figure 8:
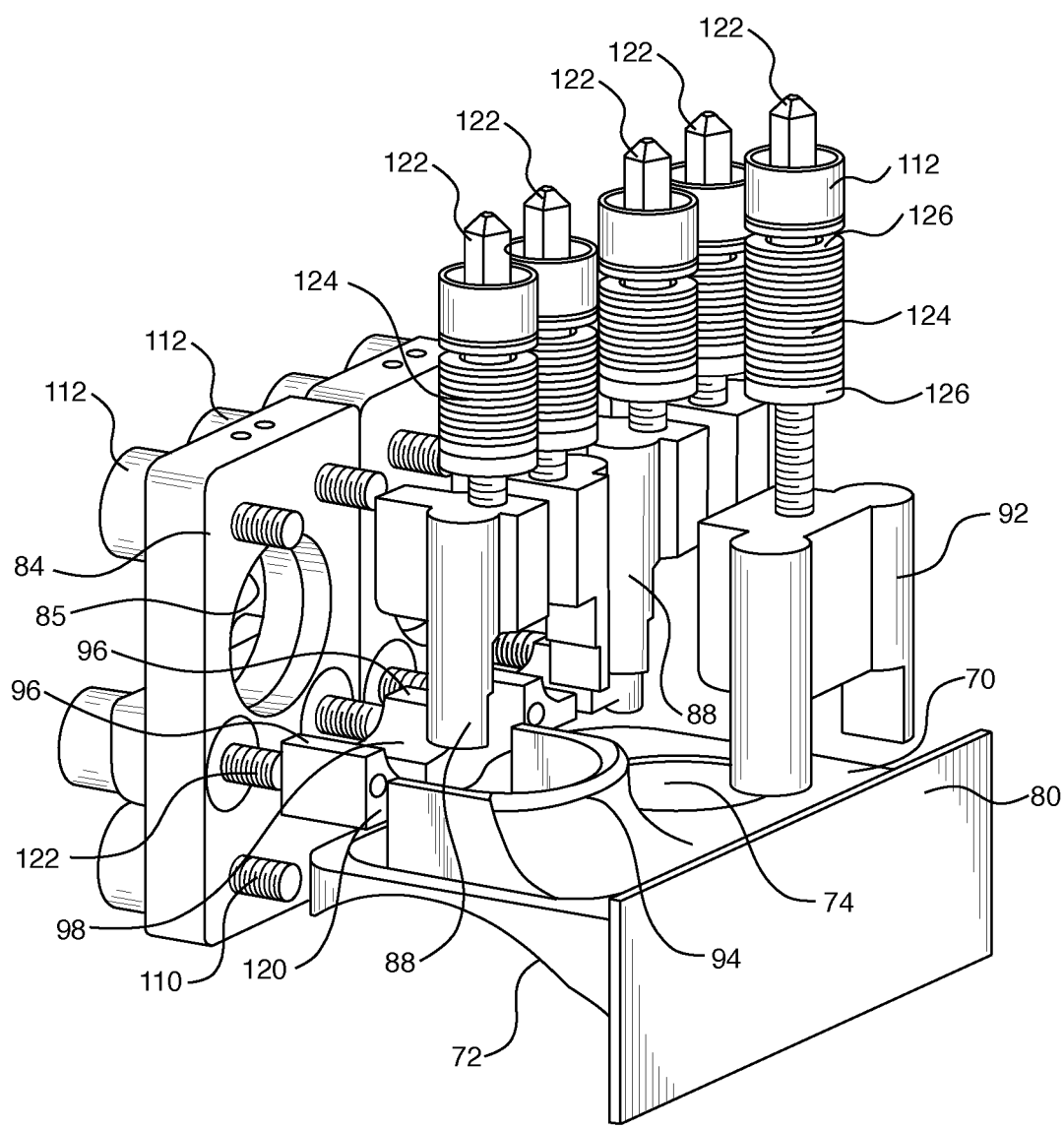
FIG. 8 illustrates the internal parts of the clamp assembly of FIG. 4 with the housing removed for clarity.
Figure 9:
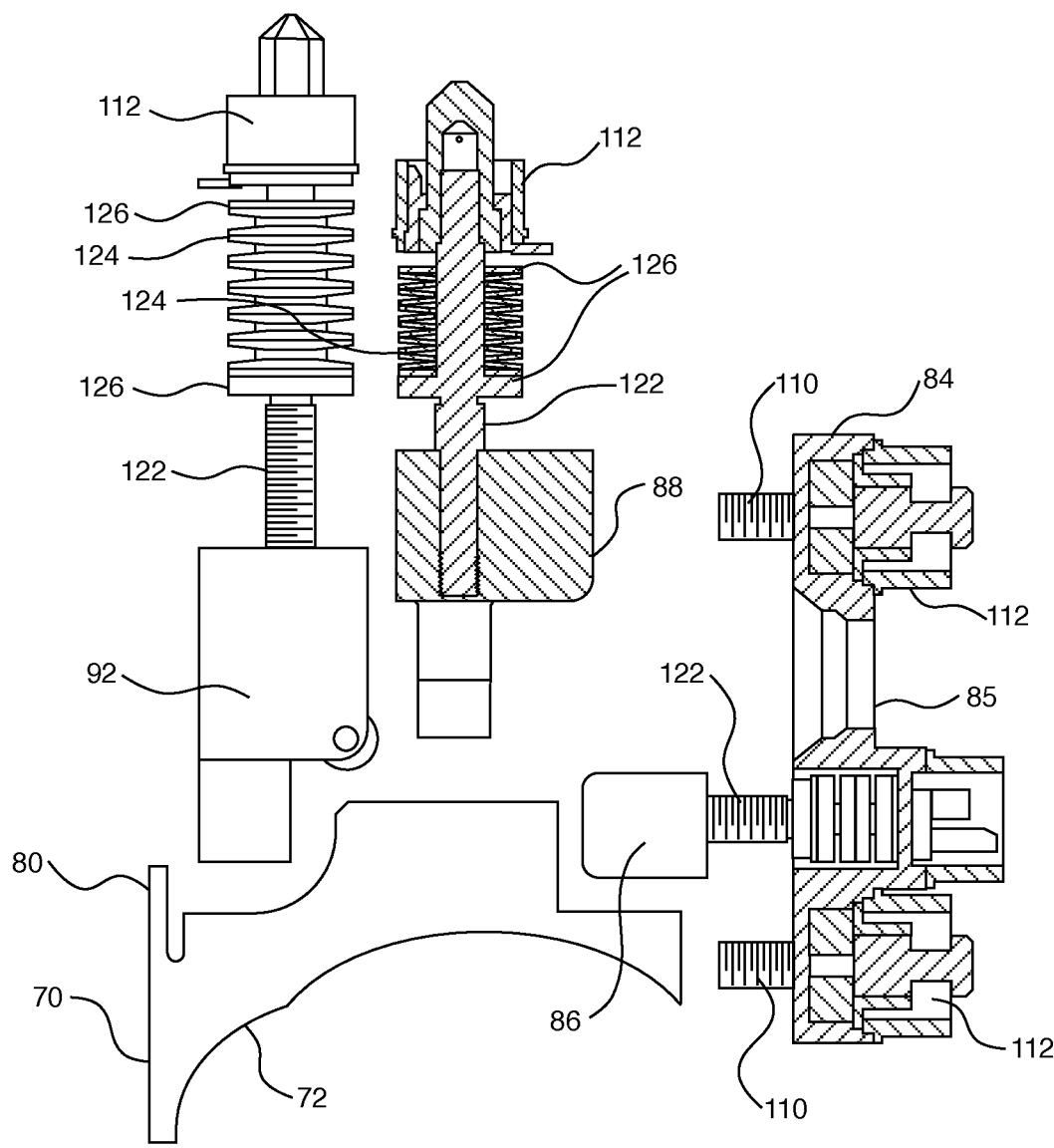
FIG. 9 illustrates a side view of the internal parts of FIG. 8.

The housing 82 contains members for securing the nozzles in position within the housing. Exemplary members include one or more specially designed wedges. FIGS. 7-9 show the internal components of clamp 200. An exemplary back wedge 92 and exemplary upper wedges 88 with top and side portions provide stabilizing support for damaged nozzles 14'. The wedges can be remotely installed from the refuel floor or a bridge above the vessel containing header pipe 12, to tighten around the existing nozzle 14' to provide two point contact 102 and 104 on each left and each right side of the top and back, respectively, of the nozzle. Additional nozzle holding points may be added to the seal saddle 70 rather than the housing 82. Wedges 92 and 88 are held in position within housing 82 by fasteners 122, such as bolts, and nuts with optional surrounds 112. Above each of the back and upper wedges 92 and 88, are springs 124 positioned between plates 126. When installed, the wedges 92 and 88 are driven down to the desired point and degree of contact with the nozzle 14' and the springs 124 are pre-loaded by adjustment of the plates 126 to allow the springs 124 to urge the wedges 92 and 88 into contact with nozzle 14' for the useful life of the reactor, regardless of temperature changes in the surrounding environment. The tightness of the wedges and the load on the springs is calculated based on measurements of conditions experienced in a given plant using one or more of the inputs described above. For example, the spectrum of vibrations experienced by nozzles 14 over a period of time can be measured and used to determine the range of positions or optimum position for the points of contact and the load on the springs and tightness of the fasteners.

Figure 10:
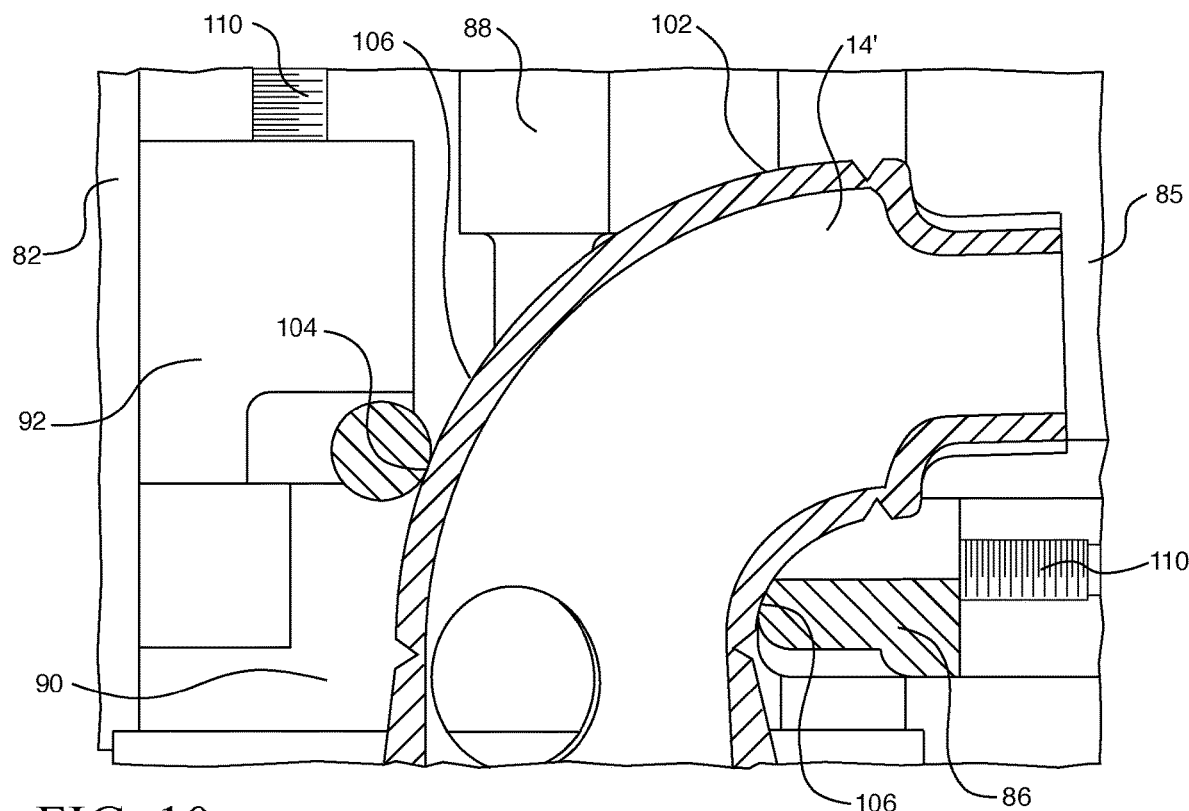
FIG. 10 illustrates a close-up section view of a portion of the clamp assembly fitted over a damaged nozzle.
Figure 11:
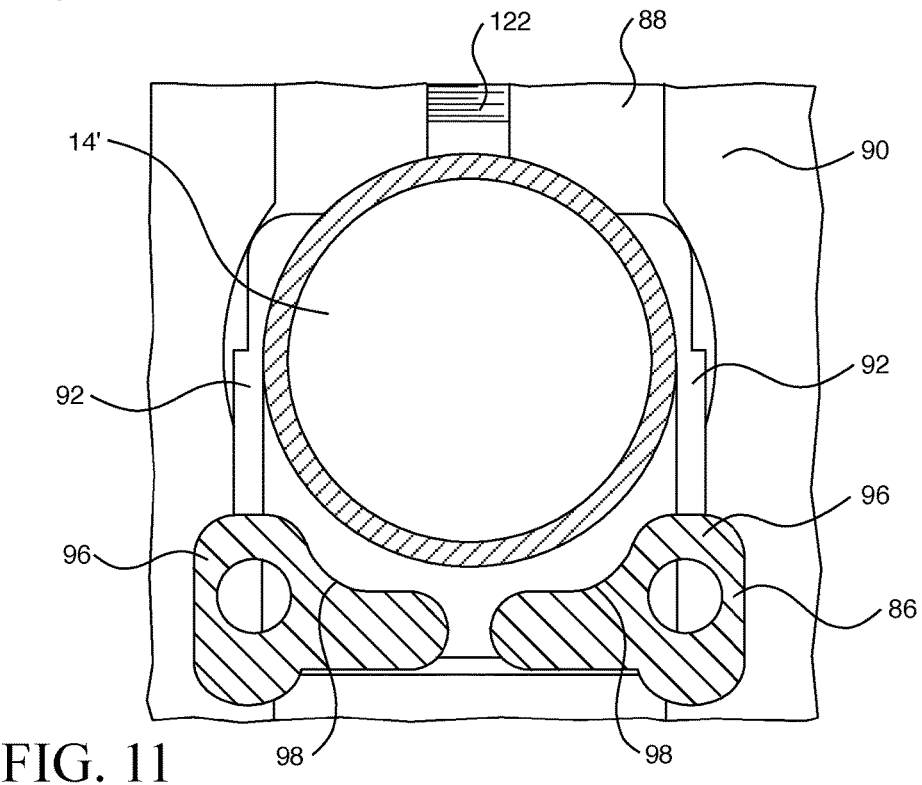
FIG. 11 illustrates a front section view of a portion of the clamp assembly fitted over a damaged nozzle of FIG. 10.

Additional front wedges 86 provide additional members for securing the nozzles in the housing are positioned in the housing 82 and attached to the interior side of the orifice plates 84 with fasteners 122 and nuts, with shielding surrounds 112. Front wedges 86 include a side section 96 and a curved surface 98 that sits under a portion of nozzle 14' to provide the third point of contact 106 on the front underside of the nozzle 14'. FIG. 10 illustrates the interior chamber 90 within housing 82 and three points of contact 102, 104, and 106 (circled areas) of the wedges 88, 92, and 86, respectively, with the nozzle 14' on one side of nozzle 14'. FIG. 11 illustrates the exemplary contact of the wedges 86, 88, and 92 at the front, each side, and back of a nozzle 14'. With all wedges installed and tightened to the desired degree, the nozzle 14' is completely captured from an FME standpoint and stabilized from a flow and vibration standpoint. The position of each point of contact 102, 104, and 106 is calculated to provide a positive force sufficient to ensure the nozzle 14' is held in position within housing 82 even if the crack in the damaged nozzle spreads all the way along the nozzle.

In order to determine the appropriate tightness for the various fasteners and the load on the springs, if present, for the clamps 10, 100, or 200, certain calculations will be made according to the experience in a given power plant. For example, hydraulic flow analysis of the repaired hardware and sparger nozzle may be calculated using values for the hydraulic resistance of the sparger both for the nozzles 14 as originally designed and for the as repaired configuration. The flow per outlet nozzle and overall pressure drop for the sparger may be calculated for the originally designed configuration and the as repaired configuration. The results of this analysis would be used to assess the impact of the repair on reactor core inlet enthalpy uniformity.

Calculations for projected heat dissipation and other parameters instrumental in maintaining the clamps 10, 100 and 200 in stable working order will vary based on the conditions in a given power plant. Therefore, to perform the calculations, exemplary information about a specific plant may include:

a. Original sparger design drawings—including length dimensions, diameter dimensions necessary to perform calculations.

b. Plant design operating conditions including: feedwater flow, feedwater temperature, feedwater pressure, and pressure of reactor vessel.

c. Plant design operating conditions including: recirculating water flow rate, recirculating water pressure, separator liquid discharge flow rate, separator liquid discharge temperatures/pressure, dryer liquid discharge flow rate, dryer liquid discharge temperature/pressure.

d. Original mixing plenum/downcomer design drawings—including length dimensions, diameter dimensions necessary to perform calculations.

A structural evaluation of the repair design and sparger may be done to confirm the ability of the as repaired configuration to withstand various conditions. To perform the calculations, the following exemplary information from a given power plant may be used:

a. Original sparger support locations.

b. Current sparger wall thickness measurement.

c. Limiting plant transient conditions—for example: coldest feedwater into hot vessel, fastest heat-up/cool-down.

d. Plant Seismic and Non-Seismic spectra.

e. Plant design operating conditions including: recirculating water flow rate, recirculating water pressure, separator liquid discharge flow rate, separator liquid discharge temperatures/pressure, dryer liquid discharge flow rate, dryer liquid discharge temperature/pressure.

f. Feedwater and Recirculation pump speed and pressure variation ranges and number of impeller vanes for calculation of the forcing frequency ranges.

The force required to capture the sparger outlet nozzle (if not removed during repair) and the predicted crack growth for the known small flaw in the nozzle to sparger weld on a damaged nozzle (if not removed during repair) may be calculated to minimize the potential for it becoming a loose part (i.e., foreign material).

Exemplary information for calculations for the operational assessment of the clamps 10, 100 or 200 for a given plant may include the following:

a. Approved Sparger Repair Hardware design drawings and installation specifications b. Current sparger wall thickness measurement, if available.

c. Approved Thermal Analysis of Repair Hardware d. Approved Structural Analysis of Repair Hardware The various embodiments of the clamps described herein solve the problems caused by the damaged feedwater sparger nozzle 14' which includes restraining loose parts that could cause further reactor internals damage if allowed to become foreign materials, protection of the reactor pressure vessel from high frequency thermal fatigue (caused by jetting of relatively cold water onto the pressure vessel without sufficient thermal mixing), and maintaining core enthalpy uniformity.

The clamps 10, 100 and 200 described herein are significantly advantageous to power plant operators compared to conventional repair designs because the clamps do not require modification to existing plant hardware; therefore minimizing risk and reducing repair costs. Typical designs may require underwater machining such as EDM (electric discharge machining) that permanently changes plant hardware and adds outage duration or continued operation risks if the clamp or repair cannot be installed. In addition, the machining used in conventional repairs requires significantly more installation time and cost.

Although the clamps 10, 100 and 200 have been described in terms of a design to repair two nozzles, those skilled in the art will recognize that they can be applied to repair damage to a single nozzle, multiple nozzles, or other base piping repairs.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. A clamp for repairing a site of at least one damaged nozzle on a pipe for carrying liquid, the clamp comprising:
    a housing configured for mounting over the site on a surface of the pipe, the housing having a front, sides, top, and back, and an opening through the front of the housing through which liquid from the pipe can flow;
    a bottom surface which, together with the housing defines an interior chamber, the bottom surface having an opening for alignment, upon installation, with the site;
    at least one member for securing one of the damaged nozzle or a replacement nozzle in position within the housing;
    wherein the securing member comprises a wedge configured to contact and support the damaged or replacement nozzle for providing at least three points of contact on each side of the damaged or replacement nozzle.

2. The clamp recited in claim 1 wherein the bottom surface has a concavely curved surface for complementary contact with the convexly curved surface of the pipe for sealing the housing against leaks.

3. The clamp recited in claim 1 wherein the site on the pipe is an opening where a damaged nozzle was removed and the securing member comprises a support ring surrounding the opening for positioning the replacement nozzle.

4. The clamp recited in claim 3 wherein the replacement nozzle is integrally machined into the housing interior and has a nozzle outlet in alignment, upon installation, with the opening through the front of the housing.

5. The claim recited in claim 1, further comprising a rear guard plate mounted to the back of the housing for preventing liquid impingement upon the vessel walls containing the pipe.

6. The clamp recited in claim 1 further comprising a latch for locking the housing and bottom surface together onto the pipe.

7. The clamp recited in claim 6 wherein the front of the housing defines a latch opening, and the latch comprises a leg and an arm extending from the upper portion of the leg, the latch being positioned such that the leg extends through the bottom surface and the arm, when rotated upon installation, extends outwardly through the latch opening to lock the housing and bottom surface together onto the pipe.

8. The clamp recited in claim 1 further comprising a pair of legs extending downwardly from the housing, the legs comprising an elongate front section, a pipe support section, and a transverse bar joining the front and support sections, the support section configured for contact, upon installation, with the pipe.

9. The clamp recited in claim 1 wherein the pipe is a header pipe and the nozzles are sparger nozzles immersed in a liquid filled vessel.

10. The clamp recited in claim 9 wherein the vessel is a portion of a nuclear power plant.

11. The clamp recited in claim 1 wherein the housing has an orifice plate positioned on the front side of the housing, the orifice plate having an opening aligned with the outlet in the nozzle.

12. The clamp recited in claim 11 further comprising a latch for locking the housing, orifice plate and bottom surface together onto the pipe.

13. The clamp recited in claim 12 wherein the front of the housing defines a latch opening, and the latch comprises a leg and an arm extending from the upper portion of the leg, the latch being positioned such that the leg extends through the bottom surface and the arm, when rotated upon installation, extends outwardly through the latch opening to lock the housing, the orifice plate and bottom surface together onto the pipe.

14. A clamp for repairing a site of at least one damaged nozzle on a pipe for carrying liquid, the clamp comprising:
    a housing configured for mounting over the site on a surface of the pipe, the housing having a front, sides, top, and back, and an opening through the front of the housing through which liquid from the pipe can flow;
    a bottom surface which, together with the housing defines an interior chamber, the bottom surface having an opening for alignment, upon installation, with the site;
    at least one member for securing one of the damaged nozzle or a replacement nozzle in position within the housing;
    wherein the securing member comprises a plurality of wedges in contact with the damaged nozzle for securing the damaged nozzle in a stable position within the housing.

15. The clamp recited in claim 14 wherein the wedges comprise a combination of two or more of front wedges, side wedges, back wedges and upper wedges for providing at least three points of contact on each side of the damaged nozzle.

16. The clamp recited in claim 15 wherein the wedges comprise upper and back wedges and further comprises a spring positioned between each of the upper and back wedges and the housing to bias the wedges into maintaining contact with the damaged nozzle in the event of movement of the nozzle.

17. The clamp recited in claim 15 wherein the damaged nozzle has curved surfaces and the front wedges comprise a side portion and a curved portion configured for complementary contact with the curved surfaces of the damaged nozzle.

18. A clamp for repairing a site of at least one damaged nozzle on a pipe for carrying liquid, the clamp comprising:
a housing configured for mounting over the site on a surface of the pipe, the housing having a front, sides, top, and back, and an opening through the front of the housing through which liquid from the pipe can flow;
a bottom surface which, together with the housing defines an interior chamber, the bottom surface having an opening for alignment, upon installation, with the site;
at least one member for securing one of the damaged nozzle or a replacement nozzle in position within the housing;
wherein the site on the pipe is an opening where a damaged nozzle was removed and the securing member comprises a support ring surrounding the opening for positioning the replacement nozzle;
wherein the replacement nozzle is integrally machined into the housing interior and has a nozzle outlet in alignment, upon installation, with the opening through the front of the housing.

19. A clamp for repairing a site of at least one damaged nozzle on a pipe for carrying liquid, the clamp comprising:
a housing configured for mounting over the site on a surface of the pipe, the housing having a front, sides, top, and back, and an opening through the front of the housing through which liquid from the pipe can flow;
a bottom surface which, together with the housing defines an interior chamber, the bottom surface having an opening for alignment, upon installation, with the site;
at least one member for securing one of the damaged nozzle or a replacement nozzle in position within the housing; and
a rear guard plate mounted to the back of the housing for preventing liquid impingement upon the vessel walls containing the pipe.

20. A clamp for repairing a site of at least one damaged nozzle on a pipe for carrying liquid, the clamp comprising:
a housing configured for mounting over the site on a surface of the pipe, the housing having a front, sides, top, and back, and an opening through the front of the housing through which liquid from the pipe can flow;
a bottom surface which, together with the housing defines an interior chamber, the bottom surface having an opening for alignment, upon installation, with the site;
at least one member for securing one of the damaged nozzle or a replacement nozzle in position within the housing; and
a latch for locking the housing and bottom surface together onto the pipe;
wherein the front of the housing defines a latch opening, and the latch comprises a leg and an arm extending from the upper portion of the leg, the latch being positioned such that the leg extends through the bottom surface and the arm, when rotated upon installation, extends outwardly through the latch opening to lock the housing and bottom surface together onto the pipe.

21. A clamp for repairing a site of at least one damaged nozzle on a pipe for carrying liquid, the clamp comprising:
a housing configured for mounting over the site on a surface of the pipe, the housing having a front, sides, top, and back, and an opening through the front of the housing through which liquid from the pipe can flow;
a bottom surface which, together with the housing defines an interior chamber, the bottom surface having an opening for alignment, upon installation, with the site;
at least one member for securing one of the damaged nozzle or a replacement nozzle in position within the housing; and
a pair of legs extending downwardly from the housing, the legs comprising an elongate front section, a pipe support section, and a transverse bar joining the front and support sections, the support section configured for contact, upon installation, with the pipe.

22. A clamp for repairing a site of at least one damaged nozzle on a pipe for carrying liquid, the clamp comprising:
a housing configured for mounting over the site on a surface of the pipe, the housing having a front, sides, top, and back, and an opening through the front of the housing through which liquid from the pipe can flow;
a bottom surface which, together with the housing defines an interior chamber, the bottom surface having an opening for alignment, upon installation, with the site;
at least one member for securing one of the damaged nozzle or a replacement nozzle in position within the housing; and
a latch for locking the housing, an orifice plate and bottom surface together onto the pipe;
wherein the housing has the orifice plate positioned on the front side of the housing, the orifice plate having an opening aligned with the outlet in the nozzle;
wherein the front of the housing defines a latch opening, and the latch comprises a leg and an arm extending from the upper portion of the leg, the latch being positioned such that the leg extends through the bottom surface and the arm, when rotated upon installation, extends outwardly through the latch opening to lock the housing, the orifice plate and bottom surface together onto the pipe.

* * * * *